United States Patent
Sun et al.

(10) Patent No.: US 12,533,945 B2
(45) Date of Patent: Jan. 27, 2026

(54) COVER ASSEMBLY

(71) Applicant: Illinois Tool Works Inc., Glenview, IL (US)

(72) Inventors: Yuan Sun, Shanghai (CN); Wenquan Sha, Shanghai (CN); Wei Liu, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 391 days.

(21) Appl. No.: 18/123,638

(22) Filed: Mar. 20, 2023

(65) Prior Publication Data

US 2023/0311642 A1 Oct. 5, 2023

(30) Foreign Application Priority Data

Mar. 31, 2022 (CN) .......................... 202210345368.6

(51) Int. Cl.
*B60K 15/05* (2006.01)
(52) U.S. Cl.
CPC ...... *B60K 15/05* (2013.01); *B60K 2015/0523* (2013.01); *B60K 2015/0538* (2013.01); *B60K 2015/0561* (2013.01)
(58) Field of Classification Search
CPC ............ B60K 15/05; B60K 2015/0523; B60K 2015/0538; B60K 2015/0561
See application file for complete search history.

(56) References Cited

U.S. PATENT DOCUMENTS

| | | | | |
|---|---|---|---|---|
| 10,577,845 B2* | 3/2020 | Herczeg | ................ | E05D 15/10 |
| 12,006,751 B2* | 6/2024 | Schaafsma | ............. | B60K 15/05 |
| 12,252,006 B2* | 3/2025 | Kaneko | .............. | B60K 15/0406 |
| 2024/0383327 A1* | 11/2024 | Ning | ...................... | E05F 15/652 |
| 2024/0384585 A1* | 11/2024 | Sun | ........................ | B60K 15/05 |

FOREIGN PATENT DOCUMENTS

DE 202018106081 U1 * 11/2018 ............. B60K 15/05

* cited by examiner

*Primary Examiner* — Faye M Fleming
(74) *Attorney, Agent, or Firm* — McAndrews, Held & Malloy, Ltd.

(57) ABSTRACT

The present application relates to a cover assembly including a housing, a cover, a drive member, a first transmission member, and a second transmission member. The housing has a cavity. The cover has a closed position and an open position. The cover closes a door plate opening of a door plate when the cover is in the closed position and the door plate opening is exposed when the cover is in the open position. The drive member is movable relative to the housing. The first transmission member is rotatably connected with the cover and is rotatably connected with the drive member. The second transmission member is rotatably connected with the cover and is rotatably connected with the drive member. The drive member, the first transmission member, the second transmission member and the cover collectively form a linkage and are configured to drive the cover to move relative to the housing between the closed position and the open position. The cover assembly of the present application can prevent the cover in a closed state from being opened due to external force, and no additional locking means need to be provided. Furthermore, a cover in the open position is arranged parallel to a cover in the closed position, which can save space occupied by the cover assembly in a vehicle.

14 Claims, 4 Drawing Sheets

COVER ASSEMBLY

RELATED APPLICATION(S)

The present application claims the benefit of Chinese Patent Application No. 202210345368.6, filed Mar. 31, 2022, the contents of which are hereby incorporated by reference.

TECHNICAL FIELD

The present application relates to a cover assembly, in particular to a cover assembly for a fueling or charging port of a vehicle.

BACKGROUND

The cover assembly of the vehicle includes a housing and a cover. The cover generally opens by moving outwardly relative to the housing, allowing a driver to refuel or charge the fueling or charging port closed by the cover. However, the cover moving outwardly relative to the housing is not aesthetically pleasing.

SUMMARY

An object of the present application is to at least partially solve the above technical problem. The present application provides a cover assembly including a housing, a cover, a drive member, a first transmission member, and a second transmission member. The housing has a cavity. The cover has a closed position and an open position. The cover closes a door plate opening of a door plate when the cover is in the closed position, and when the cover is in the open position, the cover is received in the cavity and exposes the door plate opening. The drive member is movable relative to the housing. The first transmission member is rotatably connected with the cover and rotatably connected with the drive member. The second transmission member is rotatably connected with the cover and rotatably connected with the drive member. The drive member, the first transmission member, the second transmission member and the cover collectively form a linkage and are configured to drive the cover to move between the closed position and the open position relative to the housing.

According to the cover assembly of the present application, the linkage is configured such that: when the cover is in the closed position, the first and second transmission members are substantially perpendicular to the cover and the drive member, thereby locking the cover in the closed position.

According to the cover assembly of the present application, the housing has a height direction and a length direction. As the cover moves from the closed position to the open position, the cover moves downward in the height direction and left in the length direction.

According to the cover assembly of the present application, the cover is provided above the drive member, and the first transmission member and the second transmission member are provided between the cover and the drive member, the first transmission member and the second transmission member being provided in parallel to each other. When the cover is in the closed position, the first transmission member and the second transmission member are disposed along the height direction, and the drive member is disposed along the length direction.

According to the cover assembly of the present application, a first end of the first transmission member is rotatably connected with a first end of the drive member, and a second end of the first transmission member is rotatably connected with a first end of the cover. A first end of the second transmission member is rotatably connected with a second end of the drive member, and a second end of the second transmission member is rotatably connected with a second end of the cover.

According to the cover assembly of the present application, a guide slot is provided on the housing, and the guide slot is in communication with the cavity. The cover assembly further includes a guide shaft connected with the cover, the guide shaft received in the guide slot.

According to the cover assembly of the present application, the guide slot includes a first portion and a second portion, the first portion and the second portion being in communication with each other, the first portion formed extending in the height direction and the second portion formed extending in the length direction.

According to the cover assembly of the present application, a first through hole is provided on the second end of the first transmission member, a cover through hole is provided on the first end of the cover, and the guide shaft is received in the first through hole and the cover through hole.

According to the cover assembly of the present application, the cover assembly further includes an auxiliary member, a first auxiliary transmission member and a second auxiliary transmission member. The auxiliary member is movable along the length direction of the housing. The first auxiliary transmission member is rotatably connected with the cover and rotatably connected with the auxiliary member. The second auxiliary transmission member is rotatably connected with the cover and rotatably connected with the auxiliary member. The auxiliary member, the first auxiliary transmission member and the second auxiliary transmission member, and the drive member, the first transmission member and the second transmission member are provided on two opposite sides of the cover, the first auxiliary transmission member, the second auxiliary transmission member, the first transmission member and the second transmission member being provided in parallel.

According to the cover assembly of the present application, a first end of the first auxiliary transmission member is rotatably connected with a first end of the auxiliary member, and a second end of the first auxiliary transmission member is rotatably connected with the first end of the cover. A first end of the second auxiliary transmission member is rotatably connected with a second end of the auxiliary member, and a second end of the second auxiliary transmission member is rotatably connected with the second end of the cover.

The cover assembly of the present application includes the first transmission member and the second transmission member disposed between the drive member and the cover, thereby preventing the cover in a closed state from being opened due to external forces without the need for additional locking means. Furthermore, a cover in the open position is arranged parallel to a cover in the closed position, which can save space occupied by the cover assembly in a vehicle.

The concepts, specific structures, and technical effects of the present application will be further explained below in conjunction with the appended drawings to fully understand the purpose, features, and effects of the present application.

BRIEF DESCRIPTION OF THE DRAWINGS

The present application will become easier to understand when the following detailed description is read in conjunction with the accompanying drawings, in which.

DETAILED DESCRIPTION

Various specific embodiments of the present application will be described below with reference to the attached drawings that form a part of the present disclosure. It should be understood that while terms denoting orientation, such as "front," "rear," "upper," "lower," "left," "right," etc., are used in the present application to describe various exemplary structural parts and elements of the present application, these terms are used herein for convenience of illustration only and these terms are determined based on the exemplary orientations shown in the attached drawings. Since the examples disclosed in the present disclosure may be disposed in different orientations, these terms denoting orientation are for illustrative purposes only and should not be considered as limiting.

Figure 1A:
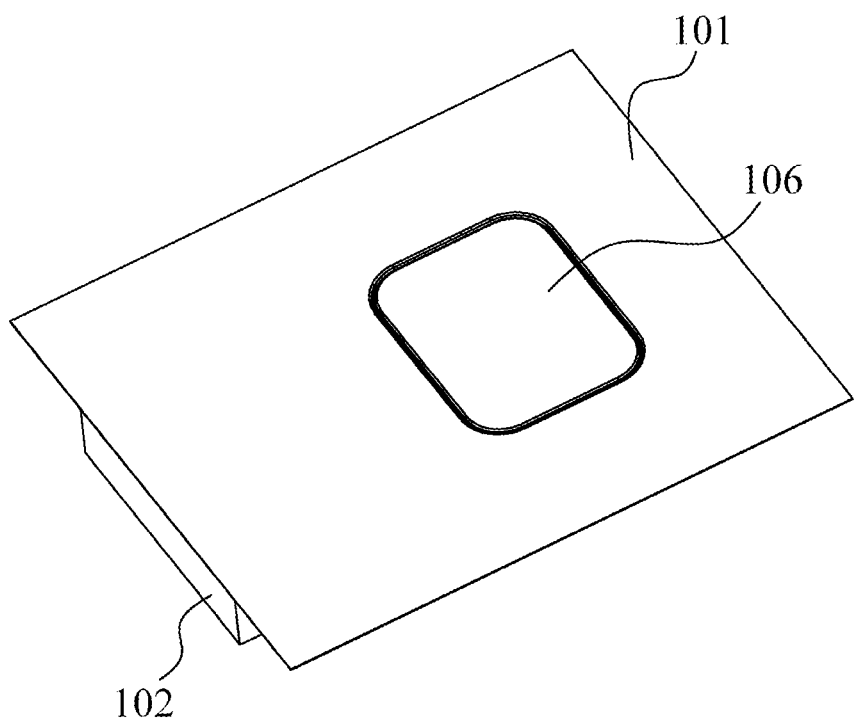
FIG. 1A is a perspective view of a cover assembly of the present application.
Figure 1B:
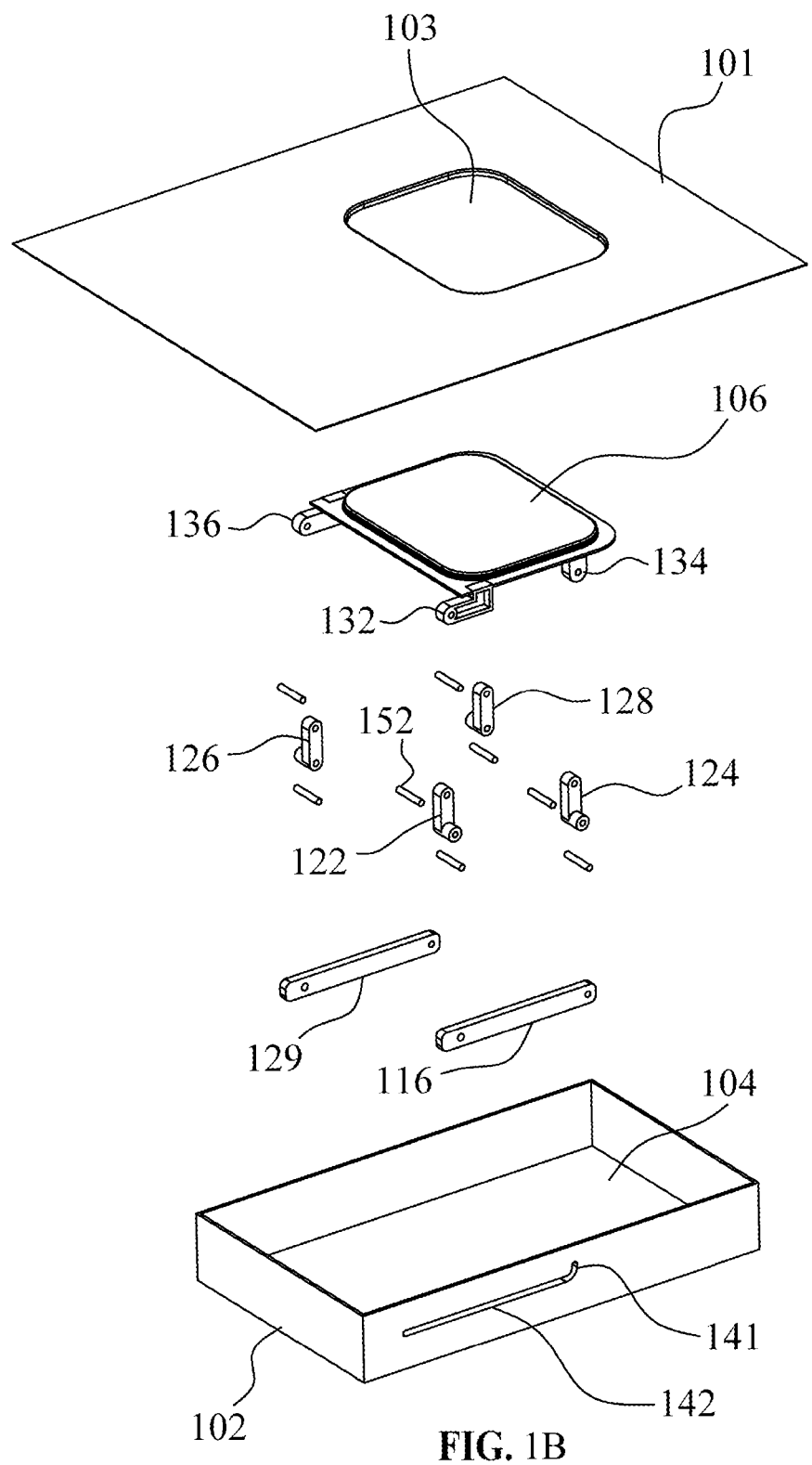
FIG. 1B is an exploded view of the cover assembly shown in FIG. 1A.

FIG. 1A is a perspective view of the cover assembly of the present application, and FIG. 1B is an exploded view of the cover assembly shown in FIG. 1A. As shown in FIGS. 1A to 1B, the cover assembly includes a door plate 101, a housing 102, a cover 106, a drive member 116, a first transmission member 122, a second transmission member 124, a first auxiliary transmission member 126, a second auxiliary transmission member 128, and an auxiliary member 129. The housing 102 is generally a rectangular parallelepiped shell with an open top. The housing 102 has a length direction, a height direction, and a depth direction. In particular, the housing 102 includes a front plate and a rear plate disposed oppositely, a left plate and a right plate disposed oppositely, and a lower plate. The front plate, the rear plate, the left plate, the right plate, and the lower plate are enclosed to form a cavity 104. The cover 106, the drive member 116, the first transmission member 122, and the second transmission member 124 are disposed in the cavity 104. The cavity 104 has an upper opening. The upper opening and the cavity 104 are in communication with each other. The door plate 101 is provided on the housing 102 and closes the upper opening of the housing 102. A door plate opening 101 is provided on the door plate 101. The door plate opening 103 runs through the door plate 101 in a top-down direction, thereby communicating with the cavity 104. The cover 106 is movable relative to the housing 102 and has an open position and a closed position. When the cover 106 is in the closed position, the cover 106 is capable of closing the door plate opening 103; when the cover 106 is in the open position, the cover 106 is received in the cavity 104, exposing the door plate opening 103. In addition, the cover 106 can also be set such that: when the cover 106 is in the closed position, an outer surface (i.e., a front surface) of the cover 106 is flush with the outer surface of the door plate 101.

As shown in FIGS. 1A to 1B, the front plate of the housing 102 is provided with a guide slot, which is in communication with the cavity 104. The guide slot includes a first portion 141 and a second portion 142. The first portion 141 and the second portion 142 are in communication with each other. The first portion 141 is formed extending along the height direction, and the second portion 142 is formed extending along the length direction. The first portion 141 and the second portion 142 are provided with rounded corners to smooth the transition.

As shown in FIGS. 1A to 1B, the cover 106 is generally planar with four generally downwardly-extending legs, i.e.: a first leg 132, a second leg 134, a third leg 136, and a fourth leg (not shown). The first transmission member 122 and the second transmission member 124 are disposed below the cover 106 and are disposed at the front side, corresponding to the first leg 132 and the second leg 134, respectively. A first end of the first transmission member 122 is rotatably connected with the first leg 132 (i.e., a first end of the cover 106) and a first end of the second transmission member 124 is rotatably connected with the second leg 134 (i.e., a second end of the cover 106). The first auxiliary transmission member 126 and the second auxiliary transmission member 128 are disposed below the cover 106 and are disposed at the rear side, corresponding to the third leg 136 and the fourth leg, respectively. A first end of the first auxiliary transmission member 126 is rotatably connected with the third leg 136 (i.e., the first end of the cover 106) and a first end of the second auxiliary transmission member 128 is rotatably connected with the fourth leg (i.e., the second end of the cover 106). The first transmission member 122, the second transmission member 124, the first auxiliary transmission member 126, and the second auxiliary transmission member 128 are arranged in parallel.

As shown in FIGS. 1A to 1B, the drive member 116 and the auxiliary member 129 are provided below the first transmission member 122, the second transmission member 124, the first auxiliary transmission member 126, and the second auxiliary transmission member 128. The drive member 116 and the auxiliary member 129 are generally rods and are disposed parallel to the cover 106. The first end of the drive member 116 is rotatably connected with the second end of the first transmission member 122, and the second end of the drive member 116 is rotatably connected with the second end of the second transmission member. The first end of the auxiliary member 129 is rotatably connected with the second end of the first auxiliary transmission member 126 and the second end of the second auxiliary transmission member 128 is rotatably connected with the second end of the second auxiliary transmission member 128. As such, the drive member 116, the first transmission member 122, the second transmission member 124, and the cover 106 collectively form a linkage, and the auxiliary member 129, the first auxiliary transmission member 126, the second auxiliary transmission member 128, and the cover 106 collectively form a linkage, and are configured to drive the cover 106 to move between the open position and the closed position.

In the present application, the rotatable connection is described with the rotatable connection between the first leg 132 and the first transmission member 122 as an example. Specifically, a first through hole is provided on the first leg 132 through the front plate of the housing 102 in the front-rear direction, and a cover through hole is provided on the first end of the first transmission member 122 through the first transmission member 122 in the front-rear direction. A guide shaft 152 is received in the first through hole and the cover through hole, thereby making a rotatable connection between the first leg 132 and the first transmission member 122.

Further, to guide the relative movement of the cover 106 relative to the housing 102, the guide shaft 152 is received in a guide slot on the housing 102. Since the first portion 141 of the guide slot is formed extending in the height direction and the second portion 142 of the guide slot is formed extending in the length direction, the drive member 116 is capable of guiding the movement of the cover 106 in the height direction and in the length direction relative to the housing 102.

Figure 2A:
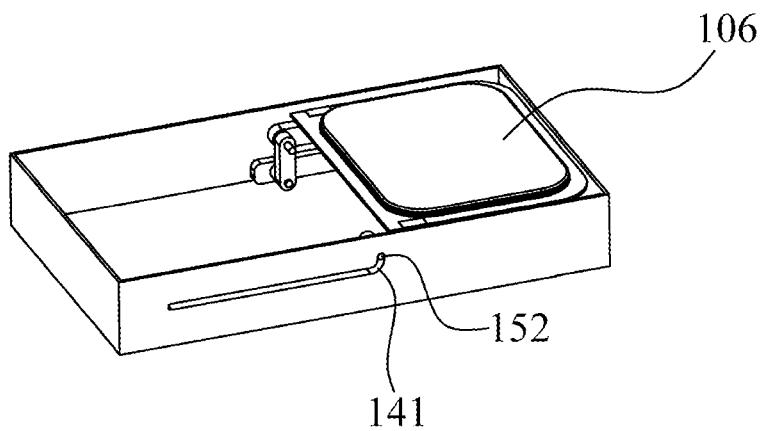
FIG. 2A is a perspective view of the cover assembly shown in FIG. 1A with a cover in a closed position and a door plate is not shown.
Figure 2B:
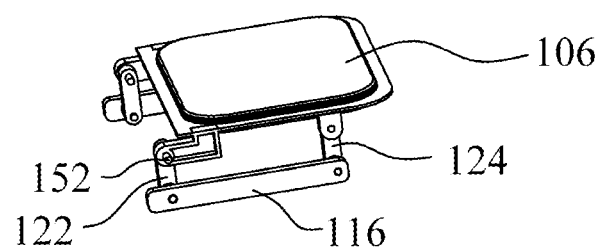
FIG. 2B is a perspective view of the cover assembly shown in FIG. 1A with the cover in the closed position and the door plate and housing not shown.

FIG. 2A is a perspective view of the cover assembly shown in FIG. 1A with the cover 106 in the closed position, and the door plate 101 is not shown. FIG. 2B is a perspective view of the cover assembly shown in FIG. 1A with the cover 106 in the closed position, and the door plate 101 and the housing 102 are not shown. As shown in FIGS. 2A to 2B, when the cover 106 is in the closed position, the cover 106 closes the door plate opening 103 (referring to FIG. 1A), the guide shaft 152 is located at the rightmost end of the guide slot, the first transmission member 122 is arranged in the height direction and the drive member 116 is arranged in the length direction. In the present application, the drive member 116 and the auxiliary member 129 are connected with a drive device (not shown). The drive device is capable of driving the drive member 116 and the auxiliary member 129 to move along the length direction. The general vertical arrangement of the first transmission member 122, the second transmission member 124, and the drive member 116 can enable the cover 106 to, when there is an external force (e.g., a person) pushing down on the cover 106, apply only a downward force to the drive member 116 without causing damage to the drive device that moves the drive member 116 in the length direction, thereby locking the cover 106 in the closed position. Further, even a non-self-locking drive device cannot cause the cover 106 to open when there is an external force to push down on the cover 106.

Figure 3A:
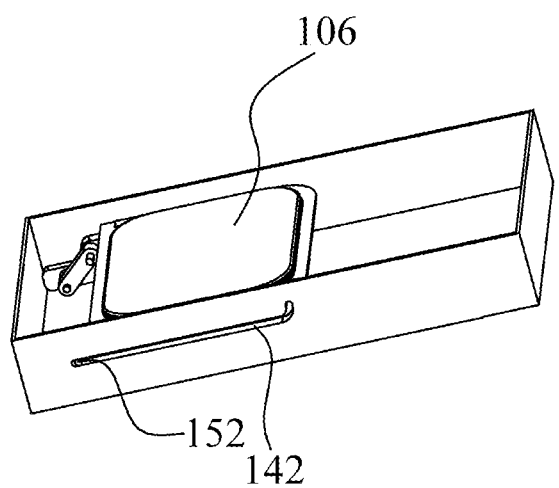
FIG. 3A is a perspective view of the cover assembly shown in FIG. 1A with the cover in an open position and the door plate not shown.
Figure 3B:
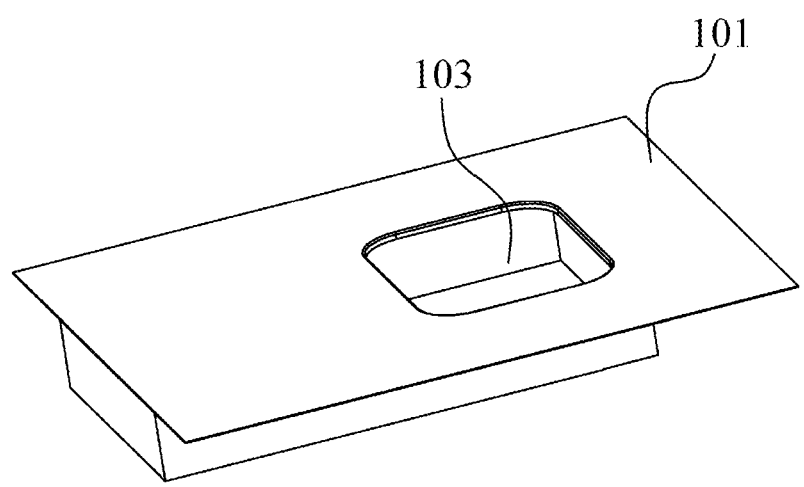
FIG. 3B is a perspective view of the cover assembly shown in FIG. 1A with the cover in the open position.

FIG. 3A is a perspective view of the cover assembly shown in FIG. 1A with the cover 106 in the open position and the door plate 101 not shown. FIG. 3B is a perspective view of the cover assembly shown in FIG. 1A with the cover 106 in the open position. As shown in FIGS. 3A to 3B, when the cover 106 is in the open position, the cover 106 exposes the door plate opening 103 and the guide shaft 152 is located at the leftmost end of the guide slot.

The process of moving the cover 106 from the closed position to the open position and from the open position to the closed position is described below with reference to FIGS. 1A, 2A to 2B, and 3A to 3B.

As shown in FIGS. 1A and 2A to 2B, the cover 106 is in the closed position. When the driver needs to open the cover 106, the driver may drive the drive device, thereby driving the drive member 116 and the auxiliary member 129 to the left in the length direction. On the one hand, the drive member 116 and the auxiliary member 129 move left in the length direction, and on the other hand the guide shaft 152 is located in the first portion 141 extending in the height direction. Therefore, the first transmission member 122 and the second transmission member 124 rotate relative to the drive member 116 driven by the drive member 116, and the first auxiliary transmission member 126 and the second auxiliary transmission member 128 rotate relative to the drive member 116 driven by the auxiliary member 129, thereby driving the cover 106 to move downward in the height direction relative to the housing 102. Subsequently, the drive member 116 and the auxiliary member 129 continue to move left in the length direction. In this case, the guide shaft 152 is located in the second portion 142 extending in the length direction, so the first transmission member 122, the second transmission member 124, the first auxiliary transmission member 126 and the second auxiliary transmission member 128 move left in the length direction, thereby driving the cover 106 to move left in the length direction relative to the housing 102. Until the guide shaft 152 is located at the left-most end of the second portion 142, the cover 106 exposes the door plate opening 103 and the cover 106 is located in the open position (as shown in FIGS. 3A to 3B). The cover 106 in the open position is arranged parallel to the cover 106 in the closed position.

When the driver needs to close the cover 106, the driver may drive the drive device, thereby driving the drive member 116 and the auxiliary member 129 to move right in the length direction. The movement of the drive member 116 and the auxiliary member 129 will drive the first transmission member 122, the second transmission member 124, the first auxiliary transmission member 126, and the second auxiliary transmission member 128 to move right in the length direction, thereby driving the cover 106 to move right until the guide shaft 152 is located at the right end of the second portion 142. Subsequently, the drive member 116 and the auxiliary member 129 continue to move right in the length direction. At this point, the guide shaft 152 is located in the first portion 141 extending in the height direction. While the drive member 116 and the auxiliary member 129 continue to move right in the length direction, the guide shaft 152, under the action of the first portion 141, drives the first transmission member 122, the second transmission member 124, the first auxiliary transmission member 126, and the second auxiliary transmission member 128 to rotate such that the cover 106 moves upward in the height direction relative to the housing 102. Until the guide shaft 152 is located at the uppermost end of the first portion 141, the cover 106 closes the door plate opening 103 and the cover 106 is in the closed position (as shown in FIGS. 1A and 2A to 2B).

It is to be noted that although the drive device drives the auxiliary member 129 to move together with the drive member 116 in the present application, in other examples, the auxiliary member 129 may not be provided.

In the prior art, when the cover is not open, it may be subjected to a vertical downward external force exerted by a person. The external force, although applied vertically downwards, can cause different problems due to the specific settings of the cover assembly. For example, a vertical downward force would have a component in the direction of movement of the cover, thus driving the movement of the cover. This requires additional locking means. For another example, a vertically downward external force would have a component in a non-moving direction of the drive device, thus damaging the drive device.

Conversely, the cover assembly of the present application includes the first transmission member 122 and the second transmission member 124 disposed between the drive member 116 and the cover 106, thereby enabling the linkage to lock the cover 106 in the closed position to prevent the cover 106 in the closed state from being opened due to external forces, and the cover assembly of the present application does not need to be provided with additional locking means. Furthermore, the cover 106 in the open position is arranged parallel to the cover 106 in the closed position, which is capable of maximizing the use of space, thereby saving space occupied by the cover assembly in the vehicle.

Although the present disclosure has been described in connection with examples of the embodiments outlined above, various alternatives, modifications, variations, improvements, and/or substantial equivalents, whether known or foreseeable now or in the near future, may be apparent to those having at least ordinary skill in the art. In addition, the technical effects and/or technical problems described in the present specification are exemplary and not limiting; therefore, the disclosure in the present specification may be used to solve other technical problems and have other technical effects and/or may solve other technical problems. Therefore, examples of the present disclosure as set forth above are intended to be illustrative and not limiting. Various changes may be made without departing from the spirit or scope of the present disclosure. Therefore, the present disclosure is intended to include all known or earlier developed alternatives, modifications, variations, improvements and/or substantial equivalents.

What is claimed is:

1. A cover assembly comprising:
   a housing having a cavity;
   a cover having a closed position and an open position, the cover closing a door plate opening of a door plate when the cover is in the closed position, and the cover being received in the cavity and exposing the door plate opening when the cover is in the open position;
   a drive member movable relative to the housing;
   a first transmission member rotatably connected with the cover and rotatably connected with the drive member; and
   a second transmission member rotatably connected with the cover and rotatably connected with the drive member
   wherein the drive member, the first transmission member, the second transmission member, and the cover collectively forming a linkage and being configured to drive the cover to move relative to the housing between the closed position and the open position, wherein
   the linkage is configured such that, when the cover is in the closed position, the first transmission member and the second transmission member are substantially perpendicular to the cover and the drive member, thereby locking the cover in the closed position.

2. The cover assembly according to claim 1, wherein:
   the housing has a height direction and a length direction; and
   as the cover moves from the closed position to the open position, the cover moves downward in the height direction and left in the length direction.

3. The cover assembly according to claim 2, wherein:
   the cover is provided above the drive member, and the first transmission member and the second transmission member are provided between the cover and the drive member, the first transmission member and the second transmission member being provided in parallel to each other; and
   when the cover is in the closed position, the first transmission member and the second transmission member are disposed along the height direction and the drive member is disposed along the length direction.

4. The cover assembly according to claim 3, wherein:
   a first end of the first transmission member is rotatably connected with a first end of the drive member, and a second end of the first transmission member is rotatably connected with a first end of the cover; and
   a first end of the second transmission member is rotatably connected with a second end of the drive member, and a second end of the second transmission member is rotatably connected with a second end of the cover.

5. The cover assembly according to claim 4, wherein:
   a guide slot is provided on the housing, the guide slot being in communication with the cavity; and
   the cover assembly further includes a guide shaft connected with the cover, the guide shaft being received in the guide slot.

6. The cover assembly according to claim 5, wherein:
   the guide slot includes a first portion and a second portion, the first portion and the second portion being in communication with each other, the first portion formed extending in the height direction and the second portion formed extending in the length direction.

7. The cover assembly according to claim 5, wherein:
   a first through hole is provided on the second end of the first transmission member, a cover through hole is provided on the first end of the cover, and the guide shaft is received in the first through hole and the cover through hole.

8. The cover assembly according to claim 1, further comprising:
   an auxiliary member movable along a length direction of the housing;
   a first auxiliary transmission member-rotatably connected with the cover and rotatably connected with the auxiliary member;
   a second auxiliary transmission member-rotatably connected with the cover and rotatably connected with the auxiliary member; and
   the auxiliary member, the first auxiliary transmission member and the second auxiliary transmission member, and the drive member, the first transmission member and the second transmission member are provided on two opposite sides of the cover, the first auxiliary transmission member, the second auxiliary transmission member, the first transmission member and the second transmission member being provided in parallel.

9. The cover assembly according to claim 8, wherein:
   a first end of the first auxiliary transmission member is rotatably connected with a first end of the auxiliary member, and a second end of the first auxiliary transmission member is rotatably connected with the first end of the cover; and
   a first end of the second auxiliary transmission member is rotatably connected with a second end of the auxiliary member, and a second end of the second auxiliary transmission member is rotatably connected with the second end of the cover.

10. A cover assembly comprising:
    a housing having a cavity;
    a cover having a closed position and an open position, the cover closing a door plate opening of a door plate when the cover is in the closed position, and the cover being received in the cavity and exposing the door plate opening when the cover is in the open position;
    a drive member movable relative to the housing;
    a first transmission member rotatably connected with the cover and rotatably connected with the drive member; and
    a second transmission member rotatably connected with the cover and rotatably connected with the drive member,
    wherein the drive member, the first transmission member, the second transmission member, and the cover collectively forming a linkage and being configured to drive the cover to move relative to the housing between the closed position and the open position, wherein the housing has a height direction and a length direction, wherein, as the cover moves from the closed position to the open position, the cover moves downward in the height direction and left in the length direction, wherein the cover is provided above the drive member, and the first transmission member and the second transmission member are provided between the cover and the drive member, the first transmission member and the second transmission member being provided in parallel to each other, wherein, when the cover is in the closed position, the first transmission member and the second transmission member are disposed along the height direction and the drive member is disposed along the length direction, wherein a first end of the first transmission member is rotatably connected with a first end of the drive member, and a second end of the first transmission member is rotatably connected with a first end of the cover, wherein a first end of the second transmission member is rotatably connected with a second end of the drive member, and a second end of the second transmission member is rotatably connected with a second end of the cover, wherein a guide slot is provided on the housing, the guide slot being in communication with the cavity, and wherein the cover assembly further includes a guide shaft connected with the cover, the guide shaft being received in the guide slot.

11. The cover assembly according to claim 10, wherein:
the guide slot includes a first portion and a second portion, the first portion and the second portion being in communication with each other, the first portion formed extending in the height direction and the second portion formed extending in the length direction.

12. The cover assembly according to claim 10, wherein:
a first through hole is provided on the second end of the first transmission member, a cover through hole is provided on the first end of the cover, and the guide shaft is received in the first through hole and the cover through hole.

13. A cover assembly comprising:
a housing having a cavity;
a cover having a closed position and an open position, the cover closing a door plate opening of a door plate when the cover is in the closed position, and the cover being received in the cavity and exposing the door plate opening when the cover is in the open position;
a drive member movable relative to the housing;
a first transmission member rotatably connected with the cover and rotatably connected with the drive member;
a second transmission member rotatably connected with the cover and rotatably connected with the drive member, wherein the drive member, the first transmission member, the second transmission member, and the cover collectively forming a linkage and being configured to drive the cover to move relative to the housing between the closed position and the open position;
an auxiliary member movable along a length direction of the housing;
a first auxiliary transmission member rotatably connected with the cover and rotatably connected with the auxiliary member;
a second auxiliary transmission member rotatably connected with the cover and rotatably connected with the auxiliary member; and
the auxiliary member, the first auxiliary transmission member and the second auxiliary transmission member, and the drive member, the first transmission member and the second transmission member are provided on two opposite sides of the cover the first auxiliary transmission member, the second auxiliary transmission member, the first transmission member and the second transmission member being provided in parallel.

14. The cover assembly according to claim 13, wherein:
a first end of the first auxiliary transmission member is rotatably connected with a first end of the auxiliary member, and a second end of the first auxiliary transmission member is rotatably connected with the first end of the cover; and
a first end of the second auxiliary transmission member is rotatably connected with a second end of the auxiliary member, and a second end of the second auxiliary transmission member is rotatably connected with the second end of the cover.

* * * * *